United States Patent [19]
Kayalioglu et al.

[11] Patent Number: 5,809,491
[45] Date of Patent: Sep. 15, 1998

[54] CALL TRAFFIC BASED EXCEPTION GENERATING SYSTEM

[75] Inventors: Inanc Kayalioglu, Nepean; John Andrew McBrayne, Ottawa; Maryam M. Sheidafar, Kanata; Steven L. Sauder, Neapean, all of Canada

[73] Assignee: Northern Telecom Limited, Montreal, Canada

[21] Appl. No.: 630,642

[22] Filed: Apr. 10, 1996

Related U.S. Application Data

[60] Provisional application No. 60/009,223, Dec. 26, 1995.
[51] Int. Cl.⁶ .............................. G06F 17/00; H04M 3/08
[52] U.S. Cl. ................................. 706/45; 379/9; 379/133; 379/134
[58] Field of Search .................... 395/50; 379/9, 379/133, 134, 137; 706/45

[56] References Cited

U.S. PATENT DOCUMENTS

| | | | |
|---|---|---|---|
| 3,866,185 | 2/1975 | Etra et al. | 364/436 |
| 5,359,649 | 10/1994 | Rosu et al. | 379/220 |
| 5,459,777 | 10/1995 | Bassa et al. | 379/133 |
| 5,488,715 | 1/1996 | Wainwright | 395/182.02 |

FOREIGN PATENT DOCUMENTS

| | | | |
|---|---|---|---|
| 0 541 145 A1 | 5/1993 | European Pat. Off. | H04M 3/36 |
| 0 708 573 A2 | 4/1996 | European Pat. Off. | H04Q 7/34 |
| 27 43 235 A1 | 4/1979 | Germany | H04Q 1/22 |
| 1 502 415 | 3/1978 | United Kingdom | H04M 3/10 |

OTHER PUBLICATIONS

Bell System Technical Journal (USA), Sep. 1978, vol. 57, No. 7, pt.2, USA, pp. 2575–2587, XP000674018, Messerli E.J.: "An Appproximation for the variance of the UPCO offered load estimation".

Bell System Technical Journal (USA), Apr. 1977, vol. 56, No. 4, pp. 561–573, XP000674019, Hill D.W.: "The effects of traffic load variation on measurement accuracy".

*Primary Examiner*—Tariq R. Hafiz
*Assistant Examiner*—Jason W. Rhodes
*Attorney, Agent, or Firm*—John A. Granchelli; Dallas F. Smith

[57] ABSTRACT

A system for generating an exception report for a particular problem based on call traffic. The system maintains a count of occurrences for that problem, happening within a sliding window of call traffic volume. When the count exceeds a threshold value, the system generates the exception report whereby appropriate action may be initiated to correct the problem.

2 Claims, 4 Drawing Sheets

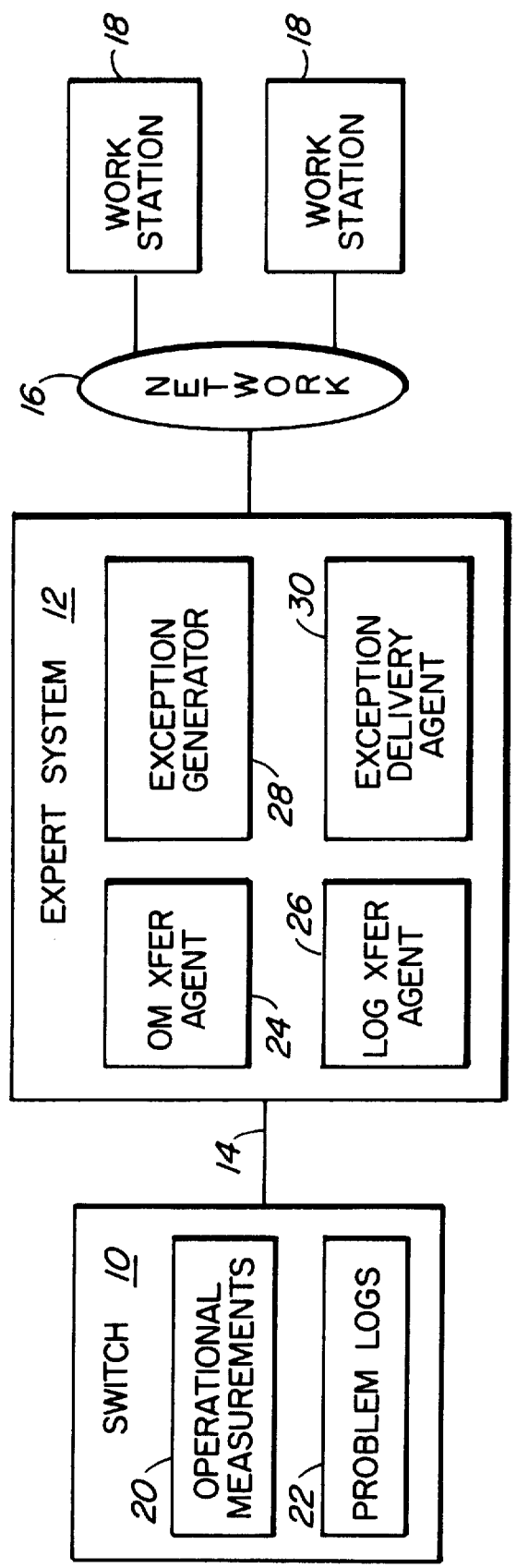
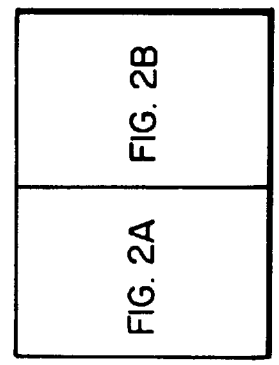
FIG. 1
FIG. 2

CALL TRAFFIC BASED EXCEPTION GENERATING SYSTEM

CROSS-REFERENCES TO RELATED APPLICATIONS

This application relates to Provisional patent application Ser. No. 60/009,223 filed on Dec. 26, 1995.

BACKGROUND OF THE INVENTION

This invention relates, generally, to systems for monitoring telecommunication networks and, in particular, to a central office switch monitoring system that generates exceptions based on thresholding call traffic.

Conventional central office switching systems typically are equipped with self-monitoring capabilities whereby certain irregular and undesirable events are identified and logged as problems. Time based thresholding of such events in order to generate exception reports is generally known. Event thresholdings are traditionally made by monitoring occurrences of events over predetermined time intervals. For example, if at least twenty-five occurrences of particular problem event happen within a thirty minute time window, then an exception report relating to that problem is generated.

Time based thresholding is deficient in that it may not precisely reflect the severity of a problem under varying volumes of call traffic at the central office switch. In other words, a certain number of problem event occurrences may be considered as being acceptable when call traffic is relatively high but the same number of occurrences happening in a low traffic context may be indicative of a significant problem requiring attention. Exception generation based solely on time can not distinguish between these two scenarios; as long as the occurrence threshold is reached within the specified time interval an exception report will be issued whereas in the first scenario such is not warranted.

It is, therefore, desirable to have a system that performs thresholding based on office traffic as an alternative technique for generating exceptions.

SUMMARY OF THE INVENTION

It is an object of the present invention to provide a new and improved call traffic based monitoring system of central office switch.

The invention, therefore, according to a first broad aspect provides a method for generating an indication when occurrences of an event exceed a threshold, comprising the steps of: defining a window of call traffic volume; monitoring for an occurrence of the event; maintaining a count of the occurrences of the event which happen within the window; and generating the indication after the count reaches the threshold.

In accordance with a second broad aspect, the invention provides a system for generating an indication when occurrences of an event exceed a threshold, comprising: means for defining a window of call traffic volume; means for monitoring for an occurrence of the event; means for maintaining a count of the occurrences of the event which happen within the window; and means for generating the indication after the count reaches the threshold.

BRIEF DESCRIPTION OF THE DRAWINGS

The invention will be better understood from the following description of a call traffic based exception generating system together with reference to the accompanying drawings, in which:

FIG. 1 is a block diagram representation of the call traffic based exception generating system;

DETAILED DESCRIPTION

Figure 2A:
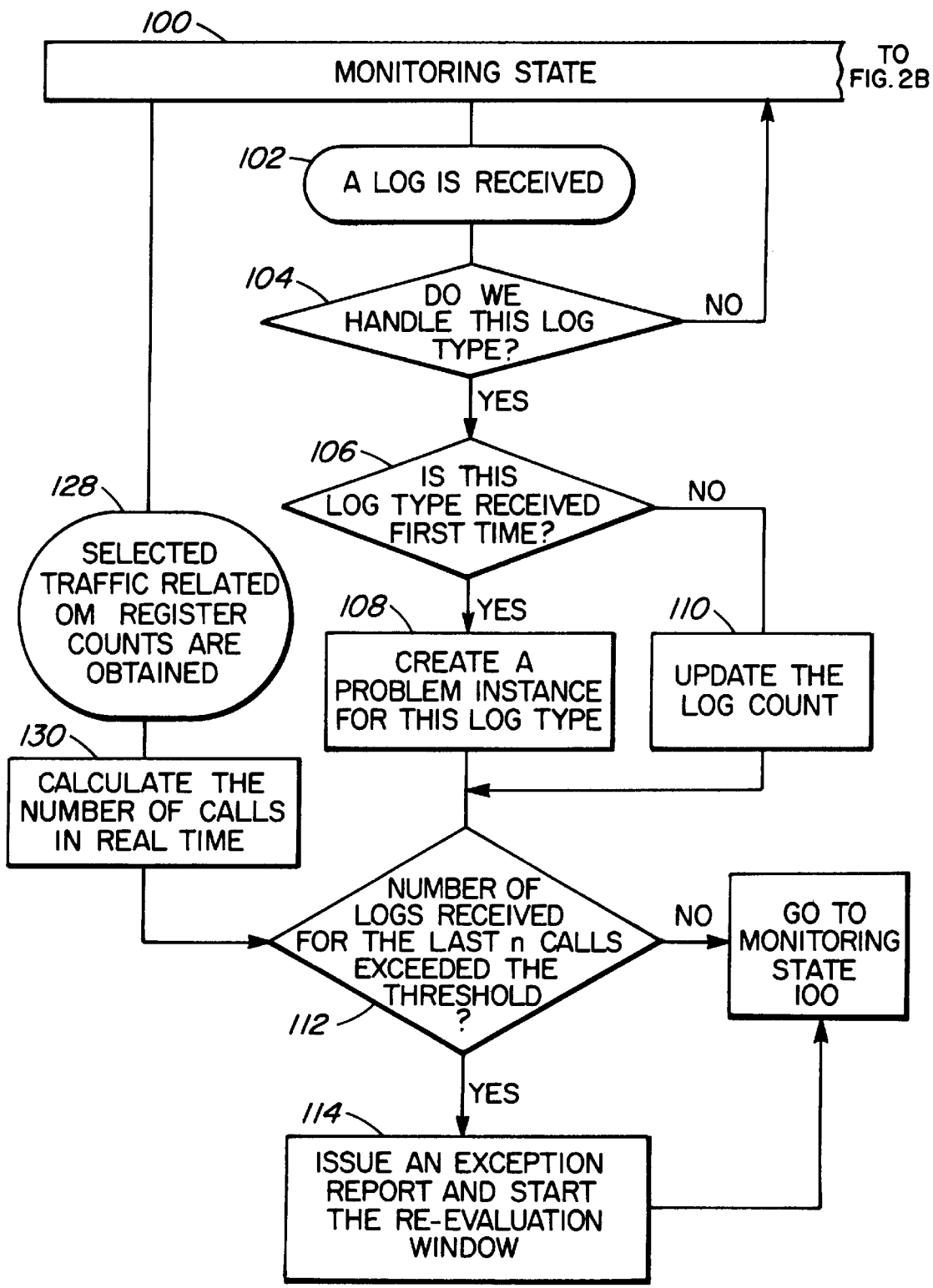
FIG. 2 is a flowchart manifesting operation of the system.

Referring to FIG. 1, illustrated is a representation of a central office switch 10 and an expert system (ES) 12 which are communicatively coupled over link 14. The ES 12 is also connected to a network 16, such as a local area and wide area network, to which multiple workstations 18 are shown connected.

The switch 10 is equipped with conventional capabilities for generating operational measurements (OMs) 20 and problem logs 22. The OMs 20 are produced by the switch 10 as peg counts of various events. Peg counts in physical terms are data registers which are incremented in response to event occurrences. Events relating to switch traffic, for instance, are number of incoming calls and number of originating calls. The problem logs 22 are produced by the switch to identify various events, some of which relate to malfunctioning of the switch 10. Northern Telecom's DMS SuperNode is an example of the switch 10 capable of generating the OMs 20 and the problem logs 22, and includes an interface whereby this data may be retrieved by adjunct devices, such as the ES 12, connected thereto.

The ES 12 is a rule based processing platform which utilizes the OMs 20 in conjunction with logs 22 of the switch 10 to perform traffic based thresholding for the purpose of exception generation. Functionality executed within the ES 12 includes OM transfer agent 24, log transfer agent 26, exception generator 28 and exception delivery agent 30. The OM transfer agent 24 and the log transfer agent 26 function to retrieve, via the link 14, the OMs 20 and the problem logs 22, respectively, which data is provided as input to the exception generator 28. The exception generator 28 is an application to monitor certain types of logs coming from the switch 10 and apply call traffic based thresholding rules thereto. For instance, if a predefined limit of a particular problem log is reached within a certain volume of call traffic (e.g., 5 logs in 10,000 calls), the exception generator 28 will generate an exception report. Determining the traffic may be effected by monitoring the peg counts of the OMs 20 which are related to the number of calls handled by the switch 10. The exception generator 28 periodically queries the switch 10, through the OM transfer agent 24 and the log transfer agent 26, at regular time intervals in order to retrieve the call traffic peg counts from the OMs 20 and the problem logs 22. The specific log types that are to be monitored together with corresponding occurrence and traffic volume limits for each type are identified in a database maintained by the ES 12. The exception delivery agent 30 will output generated exception report for routing through the network 16, for example, to one of workstations 18 which are monitored by telco maintenance personnel so that appropriate action may be taken. Northern Telecom's SuperNode Data Manager (SDM) product is an example of a hardware platform that may be appropriately programmed to provide the expert system 12.

Figure 2B:
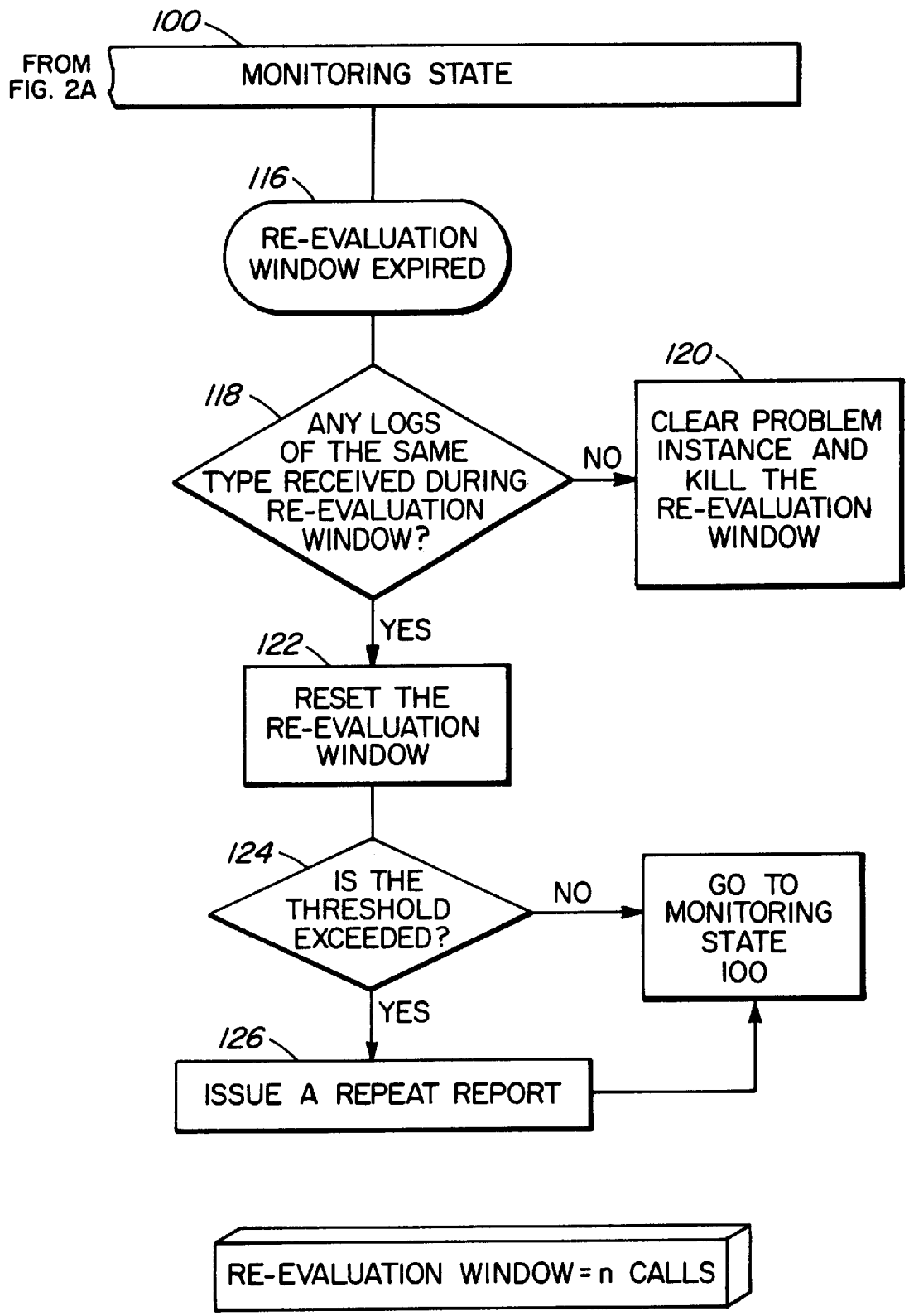

Referring to FIGS. 1 and 2 together, the steps executed by the ES 12 to implement the call traffic based exception generating system are described in the following.

In the monitoring state, step 100, the ES 12 is monitoring switch logs and OMs.

When a log is received, at step 102, the ES 12 in step 104 checks its database to see if this log type is handled. If the answer is NO, the ES 12 returns to the monitoring state, step 100. If the answer at step 104 is YES, the ES 12 checks at step 106 to see if this log type was received for the first time by searching its database for an existing problem instance having a log type matching the received type. If the answer is YES, i.e. no matching log type, in step 108 a new problem instance is created and recorded in which is the number of calls when the log occurred to note this occurrence of the log type. Each problem instance is assigned a unique problem identifier. Otherwise, if the answer at step 106 is NO, the log count reflected in the already existing problem instance is increased by one at step 110 by recording the call traffic volume for this occurrence. As each additional log with the same log type is received, the ES 12 check to see how many we have received in the last n number of calls (e.g., last 10000 calls) at step 112 by subtracting n from current call traffic count thereby defining a sliding call traffic window. If we have now exceeded the threshold level of the problem within the window, the ES 12 issues an exception report at step 114 from which execution returns to the monitoring state 100. Otherwise, for a NO answer at step 112 execution proceeds directly to step 100 where the ES 12 continues to monitor for more logs. Exception reports are transmitted over the network 16, for example, to maintenance personnel at the workstations 18.

Following issuance of the exception report, in step 114, a re-evaluation window is started and fixed to the call traffic number at which the log occurred that resulted in the exception report. Together with invoking a timer, the ES 12 waits for n more calls to occur and either when that many calls are made or the timer times-out, the re-evaluation window expires at step 116. The ES 12 then checks if any more logs of the same log type were received since the last report, at step 118. If no more logs were received, the problem no longer needs to be tracked so the ES 12, at step 120, may delete the problem instance but the unique problem identifier associated with that instance will not be reused. If some logs were received the re-evaluation window is reset whereby the ES 12 again employs a sliding window of call traffic volume and starts a new count for n calls, step 122, and checks to see if the number of logs received since the last report exceeded the threshold, step 124. If the value exceeds the threshold in the last n calls, a repeat notification exception with the same to problem identifier is generated in step 126 from which execution returns to the monitoring state, step 100. If, at step 124, the value is greater than zero but does not exceed the threshold, then no action is taken by the ES 12 which continues to monitor for more logs in step 100. For repeat notification exceptions generated in step 126, the ES 12 will issue a repeat report transmitted over network 16 to one of the workstations 18. If the re-evaluation window, which was reset by the ES 12 in step 122, expires then same steps starting from 116 are repeated.

The ES 12, at step 128, also monitors selected traffic related OMs 20 and in step 130 calculates the number of calls in real time. This number is used in steps 112 and 116.

Figure 3:
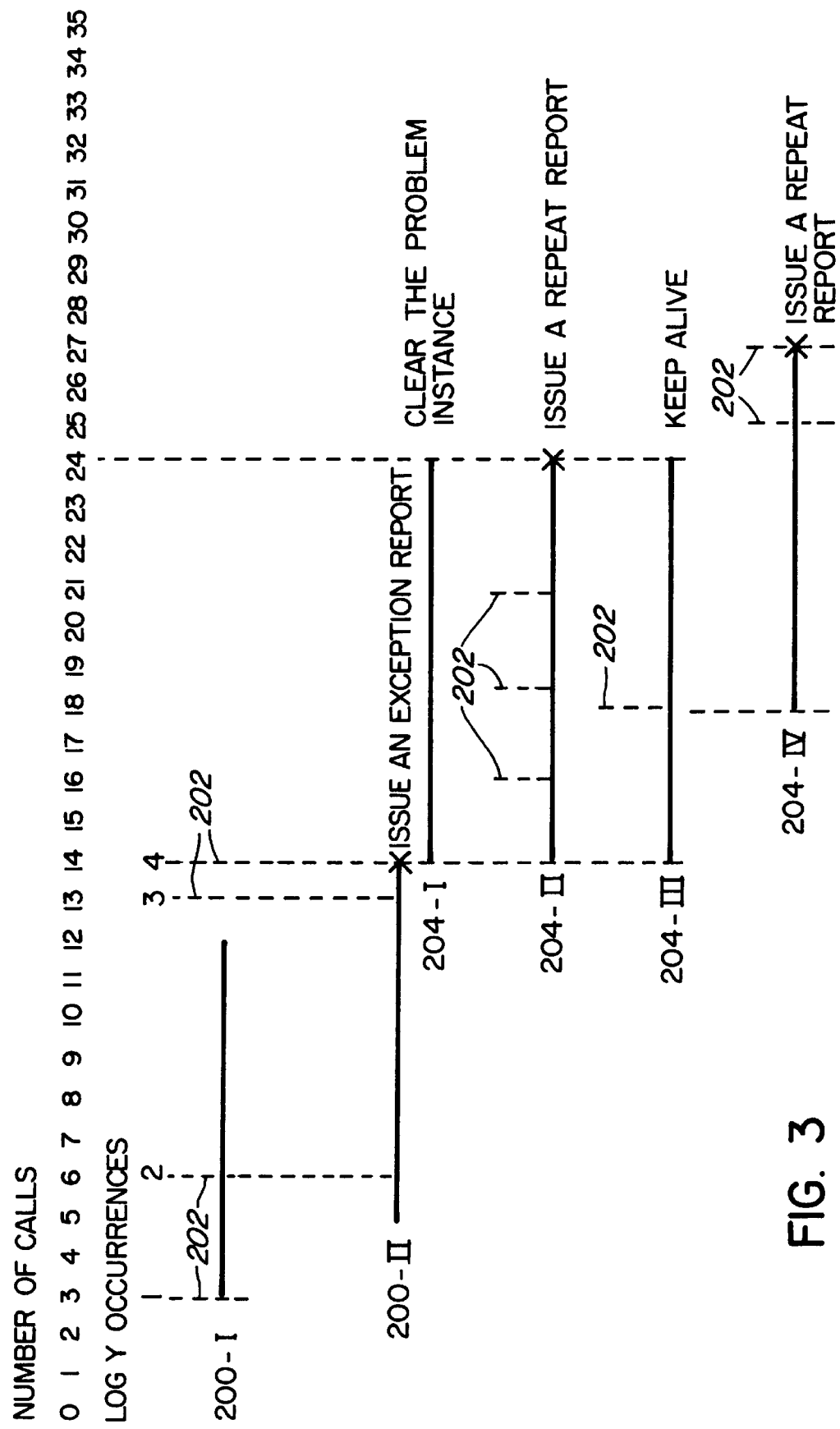
FIG. 3 is a chart of call traffic illustrating examples of call traffic based exception generation.

Turning now to FIG. 3, shown is a call traffic chart to exemplify the traffic based exception generating operation of the ES 12 in FIG. 1 and explained by FIG. 2. Assume thresholding limits of 3 occurrences within a traffic window of 10 calls for a particular problem event, identified as Log Y. Horizontal lines labeled 200 represent a sliding call traffic window of 10 calls and vertical lines labeled 202 each represent an occurrence of Log Y. Horizontal lines labeled 204 represent a fixed window of 10 calls occurring after the issuance of a prior exception report.

A first exception report is issued at call count 14 (i.e., 14th call of call traffic volume). The first occurrence of Log Y at call count 3 does not contribute to the issuance of the first exception report since the third log appears at the 13th call. In other words, only two Log Y type events happen within the 10 call window of line 200-I. The exception log is issued on the fourth Log Y at call count 14 because three logs (i.e., logs 2, 3 and 4 at counts 6, 13 and 14, respectively) occur between the 5th and 14th calls, indicated on line 200-II;

Following generation of the first exception report, any of four possible scenarios may occur. No further Log Y type events may happen in the next ten calls, as indicated by line 204-I, which results in the problem instance being cleared. Line 202-II represent that another three (and possibly more) Log Y events happen during the next 10 calls, resulting in issuance of a repeat report which identifies the same problem. If only one (or two but not three) further Log Y occurs as shown on line 204-III, then the problem instance is maintained to monitor for Log Y events within the sliding 10 call window. Line 204-IV is a continuation of line 204-III and shows two more Logs appearing in its call base window, resulting in the issuance of a repeat report with the same problem identified.

Those skilled in the art will recognize that various modifications and changes could be made to the invention without departing from the spirit and scope thereof. For instance, the call traffic based exception generating system could be readily incorporated within the central office switch instead of residing on an external adjunct processing platform. Also, other indications or signals may be generated such that the problem may be dealt with by automation or in addition to an exception report. It should therefore be understood that the claims are not to be considered as being limited to the precise embodiment of the system set forth above, in the absence of specific limitations directed to each embodiment.

I claim:

1. A method for generating an indication when occurrences of an event exceed a threshold, comprising the steps of:

defining a sliding window of call traffic volume which in effect moves with incremental call traffic volume;

maintaining a count of the event occurrences which happen within the window;

generating the indication after the count reaches the threshold;

defining a fixed window of call traffic volume and which begins at the event occurrence within the sliding window that results in the generation of the indication;

maintaining a count of the event occurrences which happen within the fixed window; and generating another indication after the fixed window count reaches the threshold.

2. A system for generating an indication when occurrences of an event exceed a threshold, comprising:

means for defining a sliding window of call traffic volume which in effect moves with incremental call traffic volume;

means for maintaining a count of the event occurrences which happen within the window;

means for generating the indication after the count reaches the threshold;

means for defining a fixed window of call traffic volume and which begins at the event occurrence within the sliding window that results in the generation of the indication;

means for maintaining a count of the event occurrences which happen within the fixed window; and means for generating another indication after the fixed window count reaches the threshold.

* * * * *